March 6, 1934.  A. V. NEMOURS ET AL  1,950,261
STOP SKID DEVICE AND CAR LOCK
Filed Jan. 30, 1932
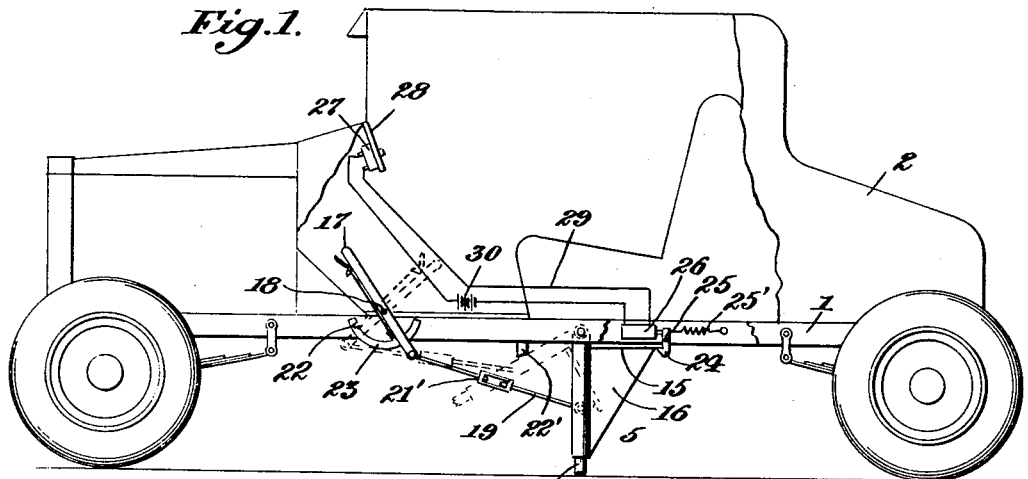
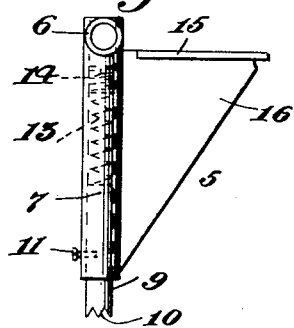
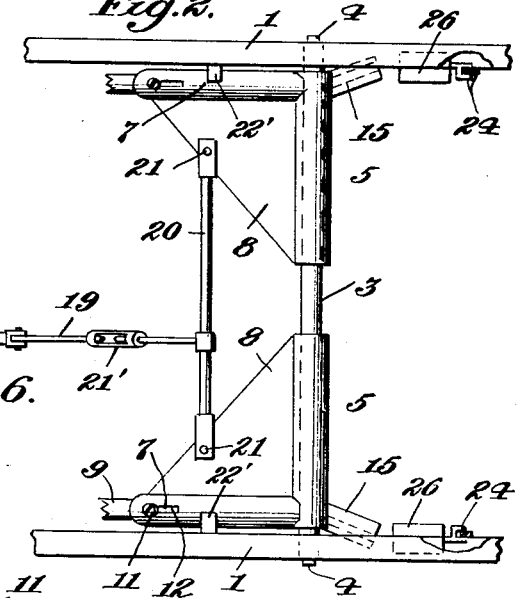
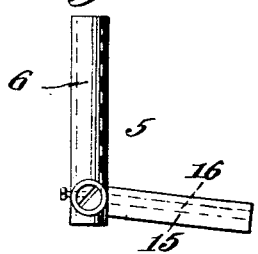
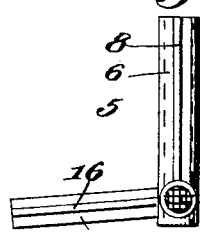
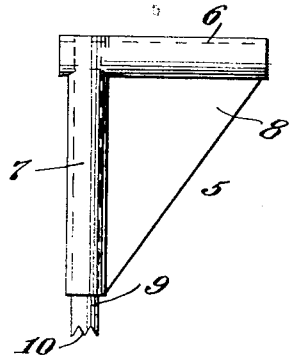
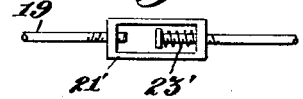
Inventors:
Auguste V. Nemours
and C. Raymond Decker,
Raymond Jones
Att'y.

Patented Mar. 6, 1934

1,950,261

UNITED STATES PATENT OFFICE 1,950,261

STOP-SKID DEVICE AND CAR LOCK

Auguste V. Nemours, Woodcliff, N. J., and Charles Raymond Decker, Boston, Mass.

Application January 30, 1932, Serial No. 589,954

9 Claims. (Cl. 188—5)

Our invention relates to a device for preventing skidding in automobiles, aeroplanes, or like vehicles, and has for its main object to provide a means carried by the vehicle and adapted when released to engage a roadway to act as a ground anchor to prevent a dangerous skid of the vehicle.

Another object is to provide a device of the character described which has means under the control of the vehicle occupant for quickly initiating the operation of the device.

Another object is to provide a non-skid device mounted on a vehicle in a position and manner to afford a maximum effectiveness in operation.

Another object is to provide means for maintaining the non-skid device in engagement with the ground or roadway to insure efficient operation as well as to function as an anti-theft prevention device.

Another object is to provide a remote controlled electric release for a detent associated with a non-skid device.

A further object is to provide a non-skid device that is simple in construction, easy to install and operate and which is economical to manufacture.

Other objects will be apparent from a study of the accompanying specification in conjunction with the drawing, wherein—

Figure 1 is a side elevation of the device in position on a vehicle showing in full lines the device in ground engaging position, and in dotted lines the device in its raised position;

Fig. 2 is a top plan view showing the parts in their raised position; and

Figs. 3 to 7 are detail views.

Referring to the drawing in detail, our device is shown as mounted on the side frame members 1—1 of an automobile 2. The main support for the device comprises a rod 3 which is secured at opposite ends by means of bolts 4 or other suitable means of support, such as a socket for rod 3. We provide a ground anchor member 5 adjacent each side frame member 1 pivotally mounted on the rod 3. It will be noted that the rod 3 is supported on the car frame slightly in the rear of the center of the frame, whereby the braking effect of the ground anchor will be applied at the most advantageous position, and whereby a slight turn of the front wheels will bring the car out of a spin due to the stabilizing effect of the device which balances the vehicle equally. Each anchor 5 has a hollow portion 6 adapted to receive the rod 3 and a leg portion 7 extends at right angles to the portion 6. A strengthening web 8 connects the portions 6 and 7 and serves as a brace for the leg portion 7.

A ground gripper foot 9 having teeth 10 is slidably mounted within each leg portion 7 and is guided and retained in place by means of a pin 11 which engages a slot 12 formed in the wall of each leg 7. A foot tension spring 13 is mounted between the foot 9 and a spring adjusting plug 14 which is adjustably threaded into the leg 7. As shown in Figs. 1 and 3 to 5, a stop arm 15 extends laterally and rearwardly from each leg portion 7 near the upper end thereof. As shown in Fig. 1, these stop arms are adapted to engage the underside of the frame 1 when the anchors are in their lowered or ground engaging position. Each arm 15 is angled outwardly to a position permitting engagement with the frame. A stop arm brace or web 16 extends from each arm 15 to a corresponding leg 7.

For the purpose of elevating the ground anchors, a hand lever 17 is pivoted at a point 18 convenient to the operator. The lower end of the lever is connected to one end of a connecting rod 19 which is pivoted at the other end to the center of a cross tie rod 20. The rod 20 is connected firmly at opposite ends to the webs 8 of the anchors at points 21. A turnbuckle 21' may be used to vary the length of the rod 19. The lever 17 may be detachably engaged in a notch 22 provided in a segment 23 and, when so engaged, the ground anchors 5 will be retained in their raised position against lugs 22' carried by the frame. A spring 23' in the turnbuckle maintains a tension in rod 19 when the anchors are raised to contact lugs 22' in a manner to prevent any rattle of parts due to vibrations.

An important feature of our invention relates to an electrical release for a detent associated with each ground anchor in a manner to unlock these anchors from their operative ground engaging position to permit raising same to their inoperative position. As shown in Fig. 1, a detent 24 is pivoted at 25 to the frame 1 at a point adjacent the free end of stop arm 15. A spring 25' is effective to rotate the detent in a clockwise direction for its engagement. A solenoid 26 has its armature pivotally connected to the upper end of the detent 24. When the solenoid is energized, its armature will rotate the detent counter-clockwise to disengage from the stop arm 15. When the anchors are dropped to their operative position, the stop arm 15 will by-pass the high point of the detent 24 and spring 25' will act to engage the detent. A key operated switch 27 is mounted on the panel board 28 and is in circuit with the wires 29, the solenoid 26 and a battery 30.

In operation, normally the lever 17 is engaged in the notch 22 and both ground anchors 5 are retained in their upper position as shown by dotted lines in Fig. 1. Upon the occurrence of a dangerous skid of the front or rear end, or both ends, of the vehicle, the operator will release the lever 17 whereby to permit the ground anchors 5 to drop quickly by gravity to a vertical position allowing the yieldable feet 9 to engage the ground on roadway surface. Due to the yielding action of the spring 13, no sudden shock will be experienced and the feet 9 will vibrate up and down rapidly, thereby applying a gradual braking force to the vehicle at a point in the rear of its center of mass which will be effective to overcome any lateral, forward or backward skid of the vehicle. The reaction of the force applied to the feet 9 will be imparted to the frame 1 through the stop arms 15 which engage the lower face of the frame. If it is desired to lock the ground anchors 5 in their operative position in order to prevent any unauthorized movement of the vehicle, the operator will release the lever 17 to permit the foot 9 to contact the ground. The vehicle is then moved forward a few inches until detents 24 latch to stop arms 15. With the ground brakes locked by the detents in their ground engaging position, the vehicle will be rendered useless for normal operation by unauthorized parties. When it is desired to raise the anchors, the operator will insert a key into switch 27 in a manner to move the switch to a closed position to energize solenoid 26 and release the detents 24.

While the anchors 5 are shown as rotatably mounted on the rod 3, we may form the same rigid with the rod and support the rod in a manner to rotate on the frame 1.

It will be obvious that the non-skid device disclosed is comprised of a minimum of parts which are so designed and arranged as to be easily installed on existing cars. The device is simple and effective in operation and economical to manufacture. The electrically controlled anchor release lock cooperates with the brake elements to increase their utility whereby they may function as a car lock in addition to their normal braking operation.

While the drawing discloses a preferred form of our invention, it is to be understood that modifications thereof are contemplated such as will fall within the scope of the appended claims.

We claim:

1. In a non-skid device in combination with a vehicle frame, a support rod mounted transversely on said frame, a non-skid brake mounted on said rod and movable to a ground engaging position, and means movable with said brake for engaging said frame while the brake is in ground engaging position.

2. In a non-skid device in combination with a vehicle frame, a support rod on said frame, a non-skid brake mounted on said rod and movable to a ground engaging position, a stop arm extending laterally from said brake and movable therewith to engage said frame when the brake is in ground engaging position.

3. In a non-skid device in combination with a vehicle frame, a support rod mounted transversely on said frame, a brake device comprising a portion surrounding said rod and a second portion extending at right angles to the first-named portion, a third portion extending at an angle to the second named portion in position to engage said frame when the brake is in ground-engaging position and a ground engaging foot mounted on the free end of said second-named portion.

4. In a non-skid device as set forth in claim 3, a brace web extending between the second and third named portions.

5. In a non-skid device in combination with a vehicle frame, a support rod on said frame, a non-skid brake rotatably mounted on said rod, said brake comprising a portion movable to engage the ground, a stop arm extending laterally from said portion and adapted to engage said frame when said portion contacts the ground and a brace extending between said arm and said portion.

6. In a ground engaging brake for vehicles, means for pivotally connecting said brake to the frame of the vehicle, and a detent operable automatically to engage said brake while in its ground engaging position.

7. In a brake as set forth in claim 6, means for moving said detent to engage the brake.

8. In a brake as set forth in claim 6, means for moving said detent to its non-engaged position.

9. In a ground engaging brake for vehicles, means for pivotally connecting said brake to the frame of a vehicle, a detent movable to engage or disengage said brake while in its ground engaging position, a solenoid adapted to move said detent to brake releasing position, a switch, a circuit including said switch and solenoid, and a key operated lock for controlling the position of said switch.

AUGUSTE V. NEMOURS.
CHARLES RAYMOND DECKER.